No. 700,544. Patented May 20, 1902.
P. McCULLOUGH, T. BLANEY & R. BARON.
PIVOT CONNECTION OF CURRENT COLLECTING OR TROLLEY POLES.
(Application filed Jan. 14, 1902.)
(No Model.)

Witnesses.

Inventors
Phelan McCullough
Thomas Blaney
Robert Baron
By Phil. T. Dodge atty.

UNITED STATES PATENT OFFICE.

PHELAM McCULLOUGH, THOMAS BLANEY, AND ROBERT BARON, OF LIVERPOOL, ENGLAND; SAID BLANEY AND BARON ASSIGNORS TO SAID McCULLOUGH.

PIVOT CONNECTION OF CURRENT-COLLECTING OR TROLLEY POLES.

SPECIFICATION forming part of Letters Patent No. 700,544, dated May 20, 1902.

Application filed January 14, 1902. Serial No. 89,642. (No model.)

*To all whom it may concern:*

Be it known that we, PHELAM McCULLOUGH, electrical engineer, residing in Tue Brook, Liverpool, and THOMAS BLANEY, electrical engineer, and ROBERT BARON, mechanical engineer, residing in Aintree, Liverpool, in the county of Lancaster, England, subjects of the King of Great Britain, have invented certain new and useful Improvements in the Pivot Connections of Current-Collecting or Trolley Poles, of which the following is a specification.

Provisional protection applied for in England May 4, 1901, No. 9,279.

This invention relates to the connection between the standards of electric vehicles and the poles which support the trolleys or current-collectors for taking current from overhead electric wires.

The object of this invention is to so arrange the current-conductors that whatever position the trolley-pole may occupy the current shall be able to pass freely from the conductor in the pole to the operating parts of the vehicle.

The invention will be best understood by reference to the accompanying drawings, in which—

Figure 1:
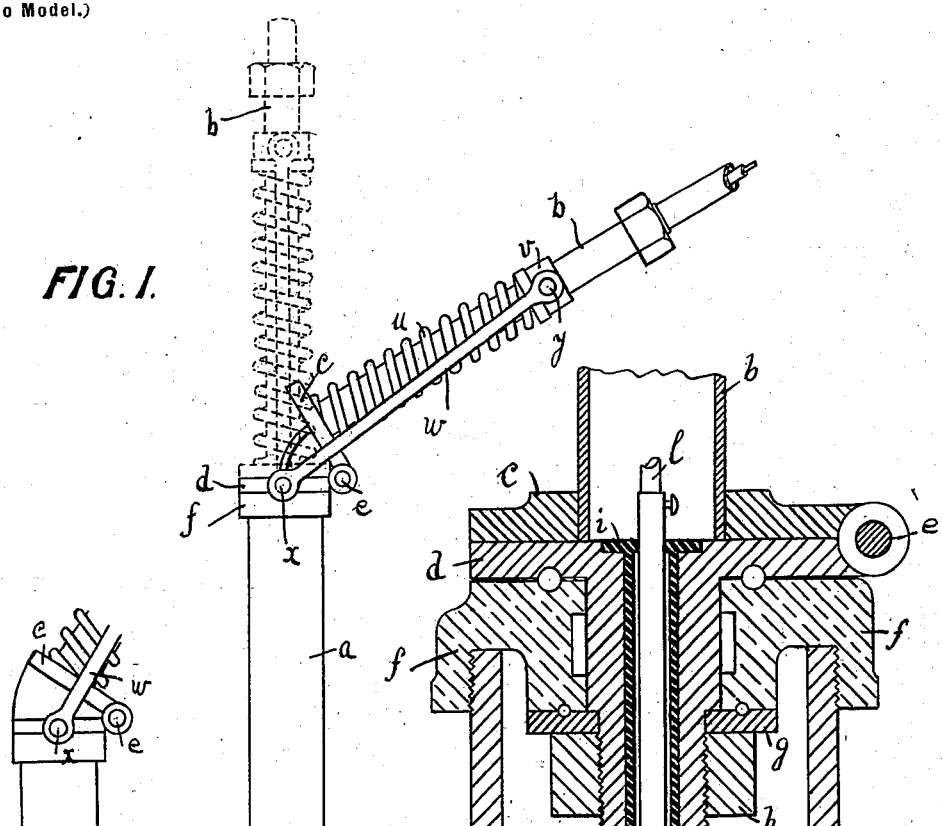
Figure 3:
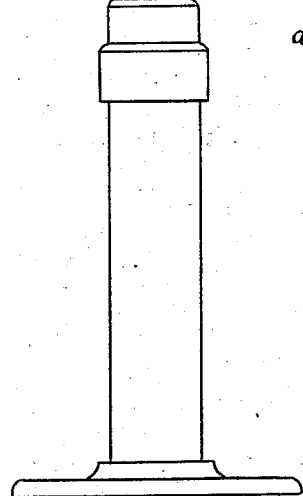
Figure 2:
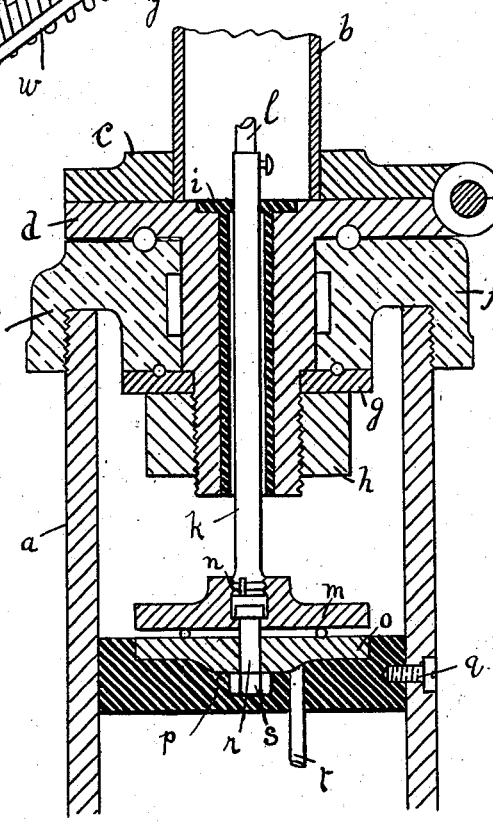

Figure 1 is an elevation of the standard, trolley-pole, and connections. Fig. 2 is a sectional view, on an enlarged scale, of the pivoting-head; and Fig. 3 is a detail view of a modification.

The standard $a$, which is mounted on the top of the vehicle, may be of any known form, that which is shown being the one generally in use upon vehicles having seats on the outside. The pole $b$ is mounted upon the top of the standard by means of a hinged revoluble head or support $c$ $d$, the parts of which are hinged together at $e$. The part $d$ is extended downward and has a ball-race on its under side, the other half of the race being formed in a cap $f$, which is screwed upon the top of the standard. In the under side of this cap is also a ball-race, and a disk $g$, secured by a nut $h$ on the downward extension of the part $d$, forms the other half of this lower bearing. A central hole through the piece $d$ is lined with wood, lignum-vitæ, or like insulation $i$, and through this latter passes the current-conducting rod $k$, which is connected to the trolley or like collector by a cable $l$, which runs up the inside of the pole $b$, and has sufficient slack or surplus length to allow the pole to be hinged over, as shown in Fig. 1, into any required position.

The lower end of the rod $k$ is screwed into a plate $m$ and is rigidly fixed therein by any suitable means—such, for instance, as a locking-pin $n$. A corresponding plate $o$ is bedded in an insulating-block $p$, which is held in position in the standard by means of a set-screw $q$. A guiding-pin $r$, adjusted by a nut $s$, serves to keep the two plates $m$ and $o$ concentric and to prevent them from separating, and balls arranged in races on the opposite faces of these plates allow the upper plate to rotate freely over the lower one and insure a constant metallic and conductive connection between the two plates. A conductor $t$ is connected to any point in the lower plate, or the pin $r$ may be continued downward and employed as a conductor; but in this case it must be in very tight contact with the lower plate.

On the lower part of the pole $b$ is a strong spiral spring $u$, the lower end of which rests upon the hinged piece $c$ and upon the upper end of which a collar $v$ bears. This collar is connected to the revoluble headpiece $d$ at $x$ by two tie-rods $w$, which are pivoted upon the collar $v$ at $y$.

In use owing to the position of the pivots $x$ the tension on the pole as it is pulled down first increases considerably; but when the usual working angle is reached—for example, that shown in full lines in Fig. 1—the tension remains approximately constant—that is to say, whether the pole be pulled down farther or allowed to rise the tension neither appreciably increases or decreases. When the pole is pulled down some distance farther, however, the tension ceases to act altogether. This occurs when the pivots $x$ $e$ $y$ are in line, and if the pole were further lowered the spring would begin to expand, tending to depress the pole still lower. In use, however, the pole never reaches the limit of the upward tension point and the relative heights of the points $x$ and $e$ are calculated so that the point of medium tension corresponds with the most usual working angle for the pole on the particular line in question, and it is only when repairs are necessary that the pole is pulled down beyond the limit of the upward tension. It will be readily understood that the theory of the relative positions of the points $x$ and $e$ is that if the point $x$ be raised or brought nearer to the point $e$ the angle of greatest tension is lowered, and if the point $x$ be lowered or placed farther away from the point $e$ the angle of greatest tension is raised.

Owing to the particular arrangement of the bearings of the pivoting-head and the contact-plates the pole is at liberty to turn relatively to the standard into any required position and may be swung around in either direction without in any way disturbing the electrical connections.

The parts $c$ and $d$ of the head, the bearing $g$, nut $h$, conductor $k$, and plate $m$ all revolve with the pole, while the cap $f$ and the plate $p$ remain stationary.

If preferred, the part $d$ of the revoluble head may be formed as shown in Fig. 3 in order to limit the upward movement of the pole, as of course it is never necessary for the latter to rise to within a considerable angle from the perpendicular and accidents might result from its freedom to do so.

The balls between the plates $m$ and $o$ should be kept rather tightly pressed between those plates in order to insure good electric contact.

We declare that what we claim is—

1. In an electric-current-collecting or trolley pole, the combination with a headpiece, of a pole connected therewith, a conductor secured and insulated in said headpiece, a plate attached to said conductor, and a second plate facing the first plate and contacting therewith through a plurality of bearing-balls.

2. In an electric-current-collecting or trolley pole, the combination with a standard, of a headpiece to which the pole is connected, a cap on the top of the standard, bearings for the headpiece in said cap, a conducting-rod secured and insulated in said headpiece, an insulated conductor connected to said conducting-rod and to the current-collector on the end of the pole, a plate on the lower end of the conducting-rod, a second plate opposite the first and rigidly mounted and insulated in the standard, balls between said plates, and a conductor for carrying away the current from the said second plate.

3. In an electric-current-collecting or trolley pole, the combination of a revoluble headpiece to which the pole is attached, a conducting-rod mounted in insulation in said headpiece, and electrically connected to the current-collector, a plate attached to said conducting-rod, a second plate facing said first plate and fixed in insulation in the standard, and balls between said plates, whereby electric contact is established between them, and in whatever position the head may be said contact is kept constant.

4. The combination of the headpiece $d\ c$ to the part $c$ of which the pole $b$ is attached, a conducting-rod $k$ mounted in insulation $i$ in said headpiece $d$, a plate $m$ attached to said conducting-rod, a plate $o$ mounted in insulation $p$ in the standard $a$, and balls between said plates, whereby the current from the collector is conveyed to the working parts of the vehicle in whatever position the head may be.

In witness whereof we have hereunto signed our names this 24th day of December, 1901, in the presence of subscribing witnesses.

PHELAM McCULLOUGH.
THOMAS BLANEY.
ROBERT BARON.

Witnesses to the signatures of the said Phelam McCullough and the said Thomas Blaney:
G. C. DYMOND,
F. P. EVANS.

Witnesses to the signature of the said Robert Baron:
GEO. E. WEBSTER,
N. H. MORTON.